(12) United States Patent
Stough et al.

(10) Patent No.: US 8,376,820 B2
(45) Date of Patent: Feb. 19, 2013

(54) FENDER-ACCESSIBLE AIR FILTER

(75) Inventors: Andrew J. Stough, Durham, NC (US);
Patrick W. Laffan, Bridgeport, PA (US);
John C. Spangler, Jr., Pekin, IL (US)

(73) Assignee: Caterpillar Inc., Peoria, IL (US)

( * ) Notice: Subject to any disclaimer, the term of this patent is extended or adjusted under 35 U.S.C. 154(b) by 832 days.

(21) Appl. No.: 10/925,969

(22) Filed: Aug. 26, 2004

(65) Prior Publication Data
US 2006/0046634 A1 Mar. 2, 2006

(51) Int. Cl.
*B60H 1/00* (2006.01)
(52) U.S. Cl. ........................................ 454/158
(58) Field of Classification Search .................. 454/158, 454/147, 149; 55/385.2, 482, 482.1, 493, 55/505
See application file for complete search history.

(56) References Cited

U.S. PATENT DOCUMENTS

| | | | |
|---|---|---|---|
| 3,844,202 A | 10/1974 | Ferguson | |
| 4,531,453 A * | 7/1985 | Warman et al. | 454/139 |
| 4,763,364 A | 8/1988 | Morgan | |
| 5,086,858 A | 2/1992 | Mizuta et al. | |
| 5,119,718 A * | 6/1992 | Wagner et al. | 454/158 |
| 5,308,279 A * | 5/1994 | Grinberg | 454/139 |
| 5,400,753 A * | 3/1995 | Andress et al. | 123/198 E |
| 5,542,489 A * | 8/1996 | Allison et al. | 180/68.5 |
| 5,551,914 A | 9/1996 | Heil et al. | |
| 5,794,733 A * | 8/1998 | Stosel et al. | 180/68.1 |
| 5,833,528 A * | 11/1998 | Baum et al. | 454/151 |
| 5,906,411 A | 5/1999 | Stauffer et al. | |
| 5,911,624 A | 6/1999 | Stauffer | |
| 6,217,439 B1 * | 4/2001 | Janeling et al. | 454/158 |
| RE37,150 E | 5/2001 | Anonychuk | |
| 6,223,807 B1 | 5/2001 | Asche et al. | |
| 6,302,749 B1 | 10/2001 | Tawa et al. | |
| 6,312,327 B1 * | 11/2001 | Hachmann et al. | 454/158 |
| 6,431,299 B1 * | 8/2002 | Asche et al. | 180/68.1 |
| 6,578,907 B2 * | 6/2003 | Teich | 296/190.08 |
| 6,745,568 B1 * | 6/2004 | Squires | 60/605.3 |
| 2003/0073400 A1 | 4/2003 | Dahl et al. | |

FOREIGN PATENT DOCUMENTS

GB 1440009 6/1976

* cited by examiner

*Primary Examiner* — Steven B McAllister
*Assistant Examiner* — Samantha Miller
(74) *Attorney, Agent, or Firm* — Finnegan, Henderson, Farabow, Garrett & Dunner LLP

(57) ABSTRACT

An air induction system is provided for a work machine having at least one fender. The air induction system has an air inlet flow member and an air filter. The air filter is disposed within the at least one fender and accessible from outside of the work machine. The air filter is fluidly connected to and disposed downstream of the air inlet flow member. The air induction system also includes a conduit fluidly connected to and disposed downstream of the air filter.

13 Claims, 2 Drawing Sheets

FENDER-ACCESSIBLE AIR FILTER

TECHNICAL FIELD

The present disclosure relates generally to an air filter and, more particularly, to an air filter that is accessible via a fender.

BACKGROUND

Work machines such as, for example, backhoe loaders, excavators, dozers, articulated trucks, and other work machines can operate in harsh, dusty conditions. In order to provide comfort to the work machine operator in these conditions, work machines often include a heating, ventilation, and air-conditioning system (HVAC) that provides clean treated air to an operator cabin. The air in such systems may be cleaned of dust and other debris by way of an air filter disposed within an induction system of the HVAC. With the aim of providing clean air, the air filter should be periodically serviced. To facilitate time efficient service of the air filter, the filter can be accessible from a point external to the operator cabin.

One such externally accessible air filter arrangement is described in U.S. Pat. No. 5,833,528 (the '528 patent) to Baum et al. The '528 patent teaches an air inlet and service access arrangement for an enclosed cab of a work vehicle. The arrangement includes a plenum having a filter and being secured to an inside of a louvered door. Outside air is drawn through the louvers and the filter to be supplied to the cab air-handling system. The filter may be accessed for servicing or replacement by opening the louvered door.

Although the arrangement of the '528 patent may provide access to the filter from a point external of the operator cab, it may occupy valuable space within the cabin, may be too complicated, and may draw air into the cabin from a point on the work machine prone to excessive amounts of dust and debris.

The disclosed air filter is directed to overcoming one or more of the problems set forth above.

SUMMARY OF THE INVENTION

In one aspect, the present disclosure is directed to an air induction system for a work machine having at least one fender. The air induction system includes an air inlet flow member and an air filter. The air filter is disposed within the at least one fender and accessible from outside of the work machine. The air filter is fluidly connected to and disposed downstream of the air inlet flow member. The air induction system also includes a conduit fluidly connected to and disposed downstream of the air filter.

In another aspect, the present disclosure is directed to a fender for a work machine that has an air induction system. The fender includes an outer shell forming an internal cavity and a recess disposed within an internal wall of the shell. The recess is configured to receive an air filter of the air induction system. The fender also includes an opening through the outer shell providing access to the internal cavity and recess from outside of the work machine and a cover hinged to the outer shell and configured to close off the opening.

In yet another aspect, the present disclosure is directed to a method of servicing an air induction system for a work machine. The method includes moving a cover away from an outer surface of a work machine fender to an open position. The method further includes accessing an air filter disposed within the work machine fender and returning the cover to a closed position on the outer surface of the work machine fender.

DETAILED DESCRIPTION

Figure 1:
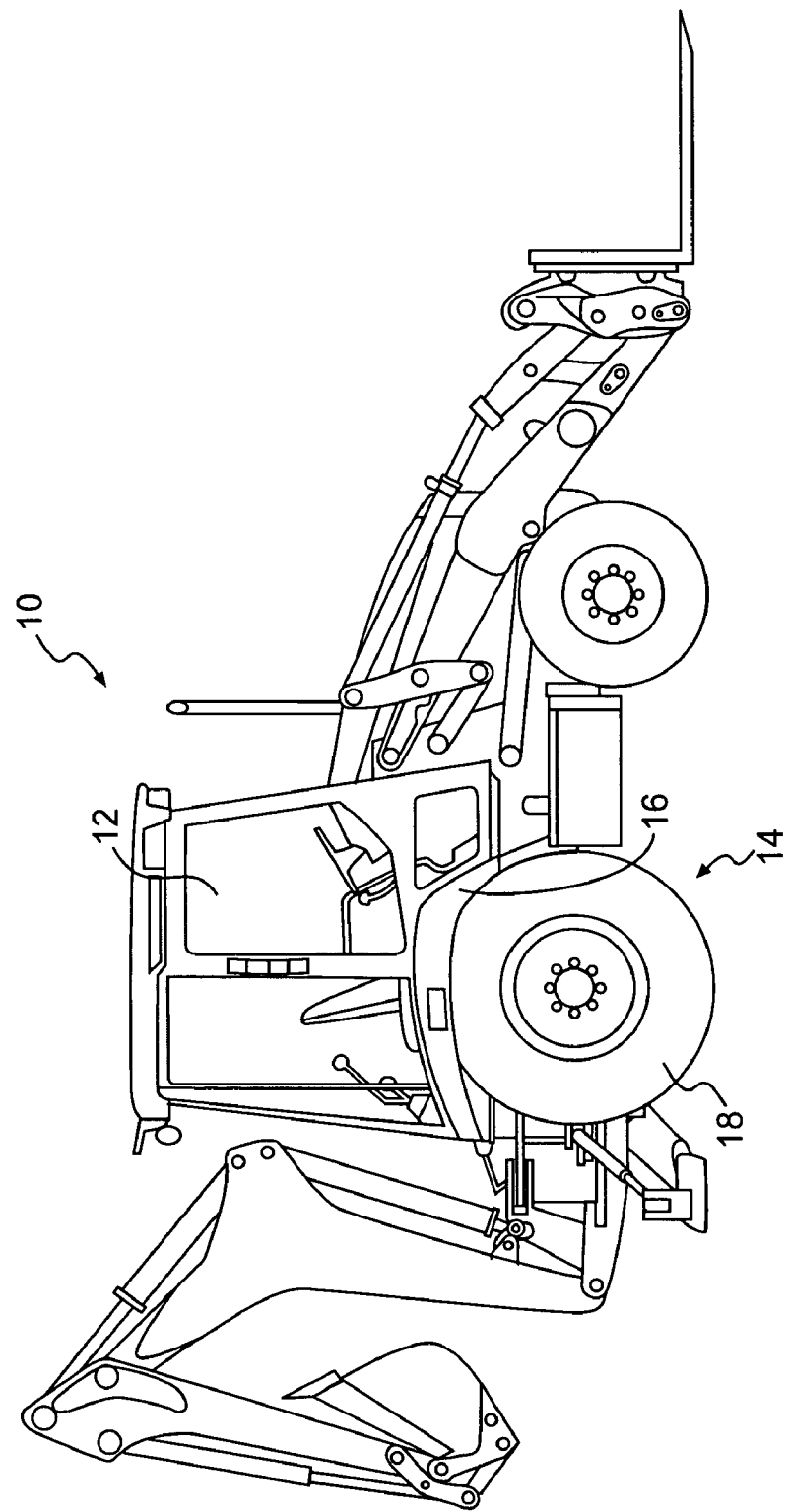
FIG. 1 is a pictorial illustration of an exemplary disclosed work machine.

FIG. 1 illustrates an exemplary work machine 10. Work machine 10 may be a fixed or mobile machine that performs some type of operation associated with an industry such as mining, construction, farming, transportation, or any other industry known in the art. For example, work machine 10 may be an earth moving machine such as a backhoe, a dozer, a loader, an excavator, a motor grader, a dump truck, or any other earth moving machine. Work machine 10 may include an operator cabin 12, at least one driven traction device 14, and a fender 16 associated with driven traction device 14.

Operator cabin 12 may include an enclosure that houses a work machine operator interface. The operator interface may include a seat and one or more work machine control devices located in proximity to the seat. Operator cabin 12 may be substantially sealed from environmental conditions in which work machine 10 operates.

Driven traction device 14 may include wheels 18 located on each side of work machine 10 (only one side shown). Alternately, driven traction device 14 may include tracks, belts or other driven traction devices. Driven traction device 14 may or may not be steerable.

Figure 2:
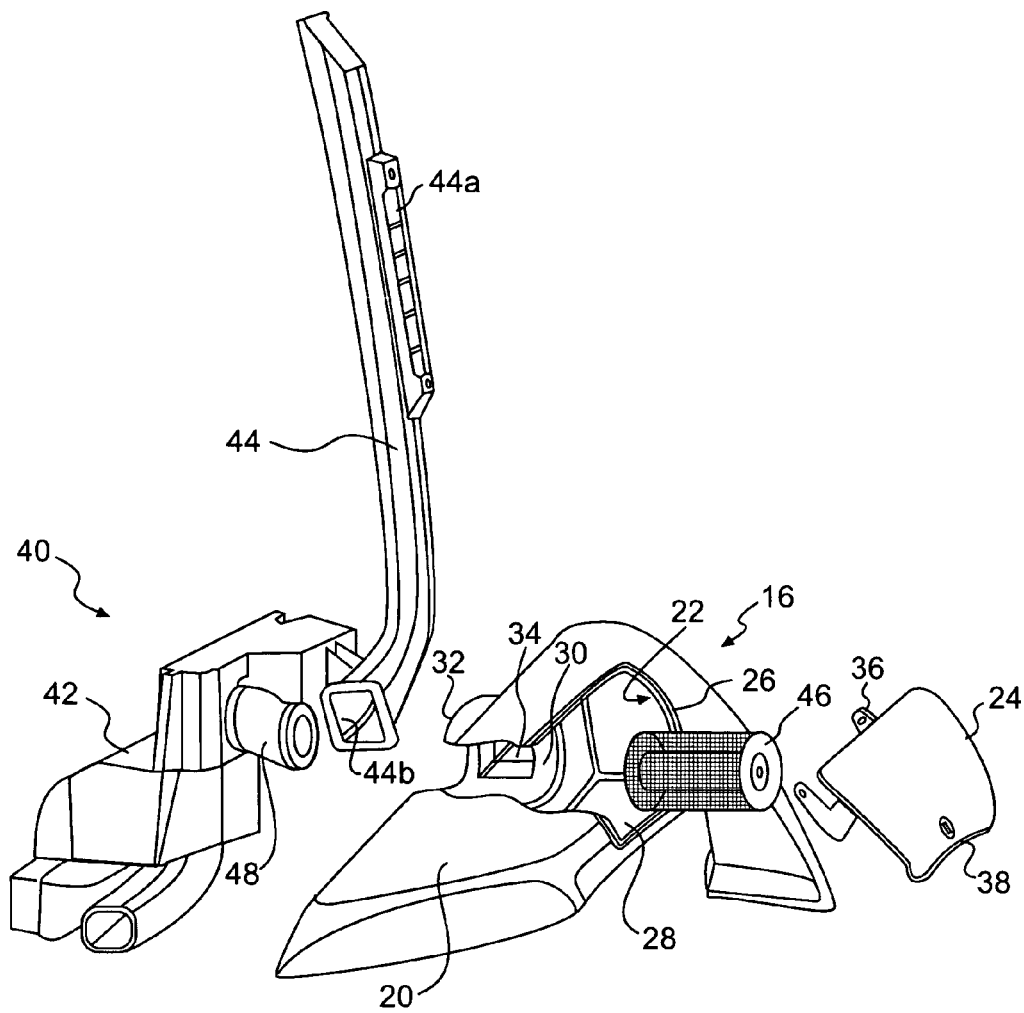
FIG. 2 is an exploded view of an exemplary disclosed air induction system for the work machine of FIG. 1.

Fender 16 may be any part of a body of work machine 10 that at least partially surrounds wheel 18. Fender 16 may be configured to minimize the redistribution of ground surface material by wheel 18 of driven traction device 14. It is also contemplated that fender 16 may be associated with a traction device that is not driven. As illustrated in FIG. 2, fender 16 may include a shell 20, a cover 24, and a sealing member 26.

Shell 20 may be formed from a synthetic polymer through an injection molding process, a thermal forming process, a blow molding process, or through any other appropriate forming or molding process known in the art. It is contemplated that some or all of the parts may alternately be formed separately and joined together through a fabrication process. It is further contemplated that shell 20 may alternately be made from metal.

Shell 20 may form an internal cavity 22 and a recess 30 accessible via a common opening 28. Internal cavity 22 may be configured for storage and may fluidly communicate with recess 30. Recess 30 may be disposed within an internal wall of shell 20 and open up into internal cavity 22. It is contemplated that internal cavity 22 may alternately be fluidly isolated from recess 30. Recess 30 may be substantially cylindrical and include a first opening 32 located in an end surface of recess 30 through shell 20, and a second opening 34 located in an outer curved surface of recess 30 through shell 20 at angle substantially orthogonal to first opening 32.

Similar to shell 20, cover 24 may also be formed from a synthetic polymer through an injection molding process, a thermal forming process, a blow molding process, or through any other appropriate forming or molding process known in the art. It is contemplated that some or all of the parts of cover 24 may alternately be formed separately and joined together through a fabrication process. It is further contemplated that cover 24 may alternately be made from metal.

Cover 24 may be configured to move between an open position allowing access to internal cavity 22 via opening 28 and a closed position where cover 24 engages a portion of shell 20 on the periphery of opening 28. Cover 24 may include at least one hinge member 36 to facilitate movement between the open and closed positions, and a locking mechanism 38 to prevent unauthorized access to internal cavity 22 when cover 24 is in the closed position.

Sealing member 26 may be disposed around opening 28 to fluidly seal cover 24 to the portion of shell 20 on the periphery of opening 28. Sealing member 26 may include synthetic gasket having a hollow tubular cross section. it is contemplated that sealing member 26 may be made of a non-synthetic material and/or may have a cross sectional shape other than hollow tubular. Sealing member 26 may be fixedly connected to either shell 20 or cover 24.

Work machine 10 may include an air-handling system 40 configured to cool, heat, and/or ventilate operator cabin 12 (referring to FIG. 1). Air-handling system 40 may include an air treatment device 42, a first fluid passageway 44, an air filter 46, and a second fluid passageway 48.

Air treatment device 42 may be configured to create a flow of air directed into operator cabin 12 and may also thermally treat the flow of air. For example, air treatment device 42 may include a fan (not shown) configured to blow air across a heat exchanger (not shown) that removes heat from the flow of air prior to directing the air into operator cabin 12. Air treatment device 42 may also include a heating coil (not shown) disposed in the air flow path to add heat to the flow of air prior to directing the air into operator cabin 12.

First fluid passageway 44 may be disposed within a structural support of operator cabin 12 and configured to direct atmospheric air to fender 16. Specifically, first fluid passageway 44 may include a louvered first end 44a open to the atmosphere at a point generally midway between a ceiling portion of operator cabin 12 and fender 16. First fluid passageway 44 may also include a second end 44b in fluid communication with second opening 34 of shell 20. In this manner, air may be drawn into air-handling system 40 via first opening 32. It is contemplated that second end 44b may include a means for sealing first fluid passageway 44 to second opening 34 of shell 20 such as, for example, a gasket-type seal configured to seal a surface of second end 44b to an outer surface of shell 20, a chemical sealant, or any other means known in the art.

Air filter 46 may be a cylindrical canister-type filter housed within recess 30. Air filter 46 may include a curved outer surface through which un-filtered air from first fluid passageway 44 of air-handling system 40 may enter and an end surface through which clean filtered air may exit air filter 46. It is contemplated that air filter 46 may include a means for retaining air filter 46 within recess 30 and/or a means for fluidly sealing air filter 46 to recess 30. The means for retaining may include for example, an internal or external threaded portion configured to engage an external or internal threaded portion of recess 30, a bolt configured to press air filter 46 against an interior end surface of recess 30, a latch connected to an interior surface of shell 20 and configured to engage air filter 46, a cover configured to enclose air filter 46 within recess 30, or any other means known in the art. The means for sealing may include, for example, one or more o-rings disposed on the outer curved surface of air filter 46 and configured to engage an interior surface of recess 30, a cover configured to seal off recess 30 from interior cavity 22, a gasket-type seal configured to seal an end surface of air filter 46 to an end surface of recess 30, or any other means known in the art.

Second fluid passageway 48 may be configured to direct the clean filtered air via first opening 32 of recess 30 from air filter 46 to air treatment device 42. Specifically, second fluid passageway 48 may include, for example, a flexible tube connectable to first opening 32 of recess 30 and air treatment device 42 by means of one or more clamps. It is also contemplated that second fluid passageway 48 may include a non-flexible tube connectable to first opening 32 of recess 30 and/or air treatment device 42 by a means other than a clamp such as, for example, a flange, a chemical bond, or any other connecting means known in the art.

Industrial Applicability

The disclosed fender accessible air filter finds potential application in any work machine where it is desirous to access a work machine air filter from a point that is external to the work machine. The fender accessible air filter is particularly advantageous in a work machine operating in harsh environmental conditions where the amount of entrained dust and debris drawn into a work machine air-handling system should be kept to a minimum.

Referring to FIG. 2, when air-handling system 40 is in operation, atmospheric air may be drawn into air-handling system 40 via first fluid passageway 44, through air filter 46 in fender 16, and through second fluid passageway 48. The filtered air may then be thermally treated, if desired, and directed into operator cabin 12.

Periodic maintenance and/or replacement of air filter 46 may be necessary to maintain the proper efficiency and functionality of air-handling system 40. Service of air filter 46 may be accomplished by opening cover 24 to expose interior cavity 22 and recess 30. After cover 24 has been moved to the open position, air filter 46 may then be removed, serviced, and re-inserted, or removed and replaced with a new air filter 46. Cover 24 may then be moved to the closed position to seal off internal cavity 22 and recess 30, and secured via locking mechanism 38.

Several advantages are realized because air filter 46 is located within fender 16 and because intake air is drawn into air-handling system 40 from a point above operator cabin 12. In particular, the location of air filter 46 does not consume any of the valuable space within operator cabin 12, thereby allowing for increased design flexibility within operator cabin 12 and a roomier interior. In addition, the easy access to air filter 46 from outside of operator cabin 12 reduces the difficulty and time associated with servicing air filter 46. Further, because air filter 46 is located within an existing feature of work machine 10, no additional complicated or expensive components are required. Also, due to the effects of gravity and the location away from work machine components that propel dust and debris into the atmosphere, the air drawn into air-handling system 40 may include a substantially lower amount of dust and debris than if the atmospheric air were drawn into air-handling system 40 from a different location on work machine 10. Further, due to the location away from an exhaust flow path and heat generating components of work machine 10, the air drawn into air-handling system 40 may be substantially cooler than if the atmospheric air were drawn from a different location. In addition, because air filter 46 is serviceable from outside of operator cabin 12, little or no dirt or debris is transferred from a used filter to operator cabin 12 during servicing.

It will be apparent to those skilled in the art that various modifications and variations can be made to the air filter of the present disclosure. Other embodiments of the component protection system will be apparent to those skilled in the art from consideration of the specification and practice of the invention disclosed herein. For example, one or more dividers or guards may be implemented to separate or protect shell 20 and the contents of internal cavity 22 from foreign material propelled by wheel 18 toward fender 16. It is intended that the specification and examples be considered as exemplary only, with a true scope of the invention being indicated by the following claims and their equivalents.

What is claimed is:

1. A fender for a machine having an air induction system and a ceiling portion, the fender comprising:
   an outer shell forming an internal cavity, the outer shell forming an exterior surface of the machine and partially surrounding at least one traction device of the machine;
   a recess disposed within an internal wall of the outer shell, the recess being configured to receive and allow removal of an air filter of the air induction system;
   an opening through the outer shell providing access to the internal cavity and the recess from outside of the machine;
   a cover hinged to the outer shell and configured to close off the opening; and
   an air inlet flow member extending upward from the outer shell to a point above the outer shell and below the ceiling portion of the machine, the air inlet flow member being configured to direct a flow of air to an operator cabin of the machine via the air filter and via an air treatment device configured to thermally treat the flow of air.

2. The fender of claim 1, further including a sealing member configured to seal the internal cavity from the atmosphere.

3. The fender of claim 1, further including an opening extending from the recess through the outer shell and configured to fluidly connect the air inlet flow member to the air filter.

4. The fender of claim 3, further including an opening extending from the recess through the outer shell and configured to fluidly connect the air filter to the air treatment device.

5. The fender of claim 3, further including a retaining member configured to retain the air filter within the recess.

6. A machine, comprising:
   an operator cabin;
   at least one traction device;
   at least one fender partially surrounding the traction device and positioned between the traction device and the operator cabin on an exterior surface of the machine, the fender having:
      an outer shell forming an internal cavity;
      a recess disposed within an internal wall of the outer shell;
      an opening though the outer shell providing access to the internal cavity and the recess from outside of the work machine; and
      a cover hinged to the outer shell and configured to close off the opening; and
   an air induction system having:
      an air inlet flow member;
      an air filter disposed within the recess of the fender and removable from outside of the machine, the air filter being fluidly connected to and disposed downstream of the air inlet flow member;
      a conduit fluidly connected to and disposed downstream of the air filter, and
      an air treatment device disposed downstream of the conduit, the air treatment device being fluidly connected to the air inlet flow member and configured to thermally treat a flow of air and direct the thermally treated flow of air into the operator cabin,
   wherein the air inlet flow member extends from the at least one fender to a point between the at least one fender and a ceiling portion of the operator cabin.

7. The work machine of claim 6, wherein the fender further includes a sealing member configured to seal the internal cavity from the atmosphere.

8. The work machine of claim 6, wherein the fender further includes an opening extending from the recess through the outer shell to the air inlet flow member.

9. The work machine of claim 8, wherein the opening is a first opening and the fender further includes a second opening extending from the recess through the outer shell to the conduit.

10. The work machine of claim 6, wherein the fender further includes a retaining member configured to retain the filter within the recess.

11. The machine of claim 6, wherein the air inlet flow member extends upward from the at least one fender such that an inlet of the air inlet flow member is located above the at least one fender.

12. The machine of claim 6, wherein the air inlet flow member is disposed within a portion of a frame of the operator cabin.

13. The machine of claim 6, wherein the air treatment device includes at least one of a fan, a heat exchanger, or a heating coil.

* * * * *